United States Patent
Hooker (10) Patent No.: US 7,234,025 B2
(45) Date of Patent: *Jun. 19, 2007

(54) MICROPROCESSOR WITH REPEAT PREFETCH INSTRUCTION

(75) Inventor: Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/980,344

(22) Filed: Nov. 3, 2004

(65) Prior Publication Data

US 2005/0080997 A1    Apr. 14, 2005

Related U.S. Application Data

(63) Continuation of application No. 10/119,435, filed on Apr. 9, 2002, now Pat. No. 6,832,296.

(51) Int. Cl.
*G06F 12/00* (2006.01)

(52) U.S. Cl. .................. 711/137; 711/122; 711/125; 711/135; 711/136; 711/137; 711/213; 711/214; 712/205; 712/206; 712/207; 712/238

(58) Field of Classification Search .............. 711/125, 711/137
See application file for complete search history.

(56) References Cited

U.S. PATENT DOCUMENTS

| | | | |
|---|---|---|---|
| 4,926,323 A * | 5/1990 | Baror et al. ................. | 712/238 |
| 5,835,967 A | 11/1998 | McMahan | |
| 6,119,203 A * | 9/2000 | Snyder et al. ............... | 711/137 |
| 6,119,222 A * | 9/2000 | Shiell et al. ................. | 712/238 |
| 6,138,213 A | 10/2000 | McMinn | |
| 6,173,410 B1 | 1/2001 | Bondi et al. | |
| 6,584,549 B2 * | 6/2003 | Abdallah et al. ........... | 711/137 |
| 6,832,296 B2 * | 12/2004 | Hooker ........................ | 711/137 |
| 2001/0027510 A1 | 10/2001 | Sasahara | |

(Continued)

OTHER PUBLICATIONS

IA-32 Intel Architecture Software Developer's Manual, vol. 2: Instruction Set Reference, 2001, pp. 3-600 to 3-601, 2-1 to 2-7, and 3-677 to 3-679.

(Continued)

*Primary Examiner*—Sanjiv Shah
*Assistant Examiner*—Zhuo H. Li
(74) *Attorney, Agent, or Firm*—E. Alan Davis; James W. Huffman (57) ABSTRACT

A microprocessor that executes a repeat prefetch instruction (REP PREFETCH). The REP PREFETCH prefetches multiple cache lines, wherein the number of cache lines is specifiable in the instruction. The instruction is specified by the Pentium III PREFETCH opcode preceded by the REP string instruction prefix. The programmer specifies the count of cache lines to be prefetched in the ECX register, similarly to the repeat count of a REP string instruction. The effective address of the first cache line is specified similar to the conventional PREFETCH instruction. The REP PREFETCH instruction stops if the address of the current prefetch cache line misses in the TLB, or if the current processor level changes. Additionally, a line is prefetched only if the number of free response buffers is above a programmable threshold. The prefetches are performed at a lower priority than other activities needing access to the cache or TLB.

19 Claims, 3 Drawing Sheets

Repeat Prefetch Instruction Operation

U.S. PATENT DOCUMENTS

2002/0073282 A1* 6/2002 Chauvel et al. ............. 711/122
2003/0033461 A1  2/2003 Malik et al.
2003/0093647 A1  5/2003 Mogi et al.

OTHER PUBLICATIONS http://www.lightsoft.co.uk/Fantasm/aoverview.html, Dec. 15, 2001.

* cited by examiner

FIG. 1

Microprocessor With Repeat Prefetch Instruction

FIG. 2 (Related Art)

Pentium III PREFETCH Instruction

FIG. 3 (Related Art)

Pentium III REP String Instruction

FIG. 4

Repeat Prefetch Instruction

FIG. 6

Repeat Prefetch Instruction Operation

MICROPROCESSOR WITH REPEAT PREFETCH INSTRUCTION

CROSS-REFERENCE TO RELATED APPLICATIONS

This application is a continuation of application Ser. No. 10/119,435, filed Apr. 9, 2002 now U.S. Pat. No. 6,832,296.

FIELD OF THE INVENTION

This invention relates in general to the field of prefetch instructions in microprocessors, and more particularly to a microprocessor having a prefetch instruction that prefetches a specified number of cache lines.

BACKGROUND OF THE INVENTION

Modern microprocessors include a cache memory. The cache memory, or cache, stores a subset of data stored in other memories of the computer system. When the processor executes an instruction that references data, the processor first checks to see if the data is present in the cache. If so, the instruction can be executed immediately since the data is already present in the cache. Otherwise, the instruction must wait to be executed while the data is fetched from the other memory into the cache. The fetching of the data may take a relatively long time—in some cases an order of magnitude or more longer than the time needed for the processor to execute the instruction to process the data.

Many software programs executing on a microprocessor require the program to manipulate a large linear chunk of data. For example, the linear chunk of data might be between 100 to 1,000,000 bytes. Examples of such programs are multimedia-related audio or video programs that process a large chunk of data, such as video data or wave file data. Typically, the large chunk of data is present in an external memory, such as in system memory or a video frame buffer. In order for the processor to manipulate the data, it must be fetched from the external memory into the processor.

If a needed piece of data is not present in the cache, the disparity in data fetching and data processing time may create a situation where the processor is ready to execute another instruction to manipulate the data, but is stalled, i.e., sitting idle waiting for the data to be fetched into the processor. This is an inefficient use of the processor, and may result in reduced multimedia system performance, for example.

In addressing this problem, modern microprocessors have recognized that many times the programmer knows he will need the data ahead of the time for execution of the instructions that actually process the data, such as arithmetic instructions. Consequently, modern microprocessors have added to or included in their instruction sets prefetch instructions to fetch a cache line of the data into a cache of the processor before the data is needed. A cache line is the smallest unit of data than can be transferred between the cache and other memories. An example of a modern microprocessor with a prefetch instruction is the Intel Pentium III® processor. The Pentium III includes a PREFETCH instruction in its Streaming SIMD Extensions (SSE) to its instruction set.

In many software applications, a programmer knows he will be manipulating a large linear chunk of data, i.e., many cache lines. Consequently, programmers insert prefetch instructions, such as the Pentium III PREFETCH, into their programs to prefetch a cache line. The programmer inserts the prefetch instructions multiple instructions ahead of the actual instructions that will perform the arithmetic or logical operations on the data in the cache line. Hence, a program may have many prefetch instructions sprinkled into it. These added prefetch instructions increase the size of the program code as well as the number of instructions that must be executed.

Furthermore, under the conventional method, not only does the programmer have to sprinkle prefetch instructions into the code, but he also has to try to place them in the code so as to optimize their execution. That is, the programmer has to try to determine the timing of the execution of the prefetch instructions so that the data is in the cache when it is needed. In particular, the programmer attempts to place the prefetch instructions in the code so they do not clobber one another. That is, in conventional processors if a prefetch instruction is currently executing and a subsequent prefetch instruction comes along, one of the prefetch instructions may be treated as a no-op instruction and not executed. This does not accomplish what the programmer wanted, and likely results in lower performance.

One problem a programmer faces when hand-placing prefetch instructions is the variability of core/bus clock ratio. In many modern microprocessors, the clock frequency of the processor bus that connects the processor to the rest of the system is not the same as the clock frequency at which the logic inside the processor operates, which is commonly referred to as the core clock frequency. The core/bus clock ratio is the ratio of the processor core clock frequency to the processor bus clock frequency.

The difference in core clock and processor bus clock frequency is attributed in part to the fact that it is common to sort processors as they are produced according to the core clock frequency that a given integrated circuit will reliably sustain. Hence, it may be that a given processor design will sort into batches of four different core clock frequencies, such as 800 MHz, 900, MHz, 1 GHz, and 1.2 GHz. However, all of these batches of processors must operate in motherboards that are designed to run at one or two fixed bus clock frequencies, such as 100 MHz or 133 MHz. Hence, in the example above, eight different combinations of core/bus clock ratios may occur. Consequently, there may be eight different numbers of core clocks that are required for a typical prefetch to complete.

The fact that a range exists of core clocks required for a typical prefetch to complete makes it very difficult for a programmer to effectively hand-place conventional prefetch instructions. This may be shown by the following example. Assume the highest core/bus clock ratio is 12, and assume a typical prefetch instruction takes about 10 bus clocks or about 120 core clocks. Assume the programmer is programming a loop that processes a single cache line of data, and the loop takes approximately 60 core clocks to execute and is not dependent upon bus activity other than the bus activity generated by the prefetch instruction.

In this case, the programmer may choose to execute a prefetch instruction every other iteration of the loop, i.e., every 120 core clocks, to accommodate the highest core/bus ratio. The programmer's choice may work well if the ratio is 12. However, if the user has a system in which the ratio is 6, a typical prefetch instruction only takes about 60 core clocks, which is only one iteration through the loop. In this scenario, a prefetch instruction will be active only half the time, which may result in stalls of the processor waiting for the data to be fetched into the cache.

Therefore, what is needed is a microprocessor that supports a prefetch instruction that facilitates efficient prefetching. What is also needed is for the prefetch instruction to efficiently fit into the Pentium III opcode space.

SUMMARY

The present invention provides a microprocessor that supports a prefetch instruction that allows a programmer to specify the number of cache lines to prefetch. Accordingly, in attainment of the aforementioned object, it is a feature of the present invention to provide a microprocessor that executes a prefetch instruction specifying a block of cache lines to be prefetched from a system memory into a cache of the microprocessor. The microprocessor includes a prefetch count register that stores a count of the cache lines remaining to be prefetched. The microprocessor also includes a general purpose register, coupled to the prefetch count register, that stores an initial value of the count. The initial value is loaded into the general purpose register by an instruction prior to the prefetch instruction. The microprocessor also includes control logic, coupled to the prefetch count register, that copies the initial value from the general purpose register to the prefetch count register in response to decoding the prefetch instruction.

In another aspect, it is a feature of the present invention to provide a microprocessor. The microprocessor includes an instruction decoder that decodes instructions in an instruction set. The instruction set includes at least a set of instructions defined by an Intel Pentium III processor. The instruction set also includes a repeat prefetch instruction. The repeat prefetch instruction includes a Pentium III PREFETCH instruction opcode, a Pentium III REP string instruction prefix preceding the opcode, and a count specifying a number of cache lines to be prefetched.

In another aspect, it is a feature of the present invention to provide a microprocessor in a system with a system memory. The microprocessor includes an instruction decoder that decodes a prefetch instruction specifying a count of cache lines to prefetch from the system memory and an address in the system memory of the cache lines. The microprocessor also includes an address register, coupled to the instruction decoder that stores the address specified in the prefetch instruction. The microprocessor also includes a count register, coupled to the instruction decoder that stores the count specified in the prefetch instruction. The microprocessor also includes control logic, coupled to the address register, which controls the microprocessor to prefetch the cache lines specified in the address register and the count register from the system memory into a cache memory of the microprocessor.

In another aspect, it is a feature of the present invention to provide a method of a microprocessor prefetching cache lines into its cache. The method includes detecting a repeat prefetch instruction specifying a count of cache lines for prefetching from a system memory address, copying the count from a general purpose register of the microprocessor to a prefetch count register, and storing the address in a prefetch address register. The method also includes prefetching a cache line specified by the prefetch address register into the cache, decrementing the prefetch count register, and incrementing the prefetch address register. The method also includes repeating the prefetching, decrementing, and incrementing steps until the prefetch count register reaches a zero value.

One advantage of the present invention is that it is backward compatible with the existing x86 instruction set architecture. This is because the Pentium III does not generate an exception for a PREFETCH instruction preceded by a REP prefix. Therefore, software programs may be written that include the repeat prefetch instruction of the present invention to execute more efficiently on a microprocessor supporting the repeat prefetch instruction according to the present invention, and the program will also execute correctly on a Pentium III.

Another advantage is that the present invention preserves x86 opcode space by re-using the PREFETCH opcode in combination with the REP prefix to virtually create a new opcode. A further advantage is that the present invention potentially reduces software code size over conventional single-cache line prefetch instructions because fewer prefetch instructions need to be included in the program. A still further advantage is that the present invention potentially improves system performance by making more efficient use of the processor bus than the conventional method. A still further advantage is that the present invention potentially improves processing performance by moving data into the microprocessor cache more efficiently than the conventional method by alleviating the problems caused by the fact that a range of core clock to processor bus clock ratios may exist.

Other features and advantages of the present invention will become apparent upon study of the remaining portions of the specification and drawings.

DETAILED DESCRIPTION

Figure 1:
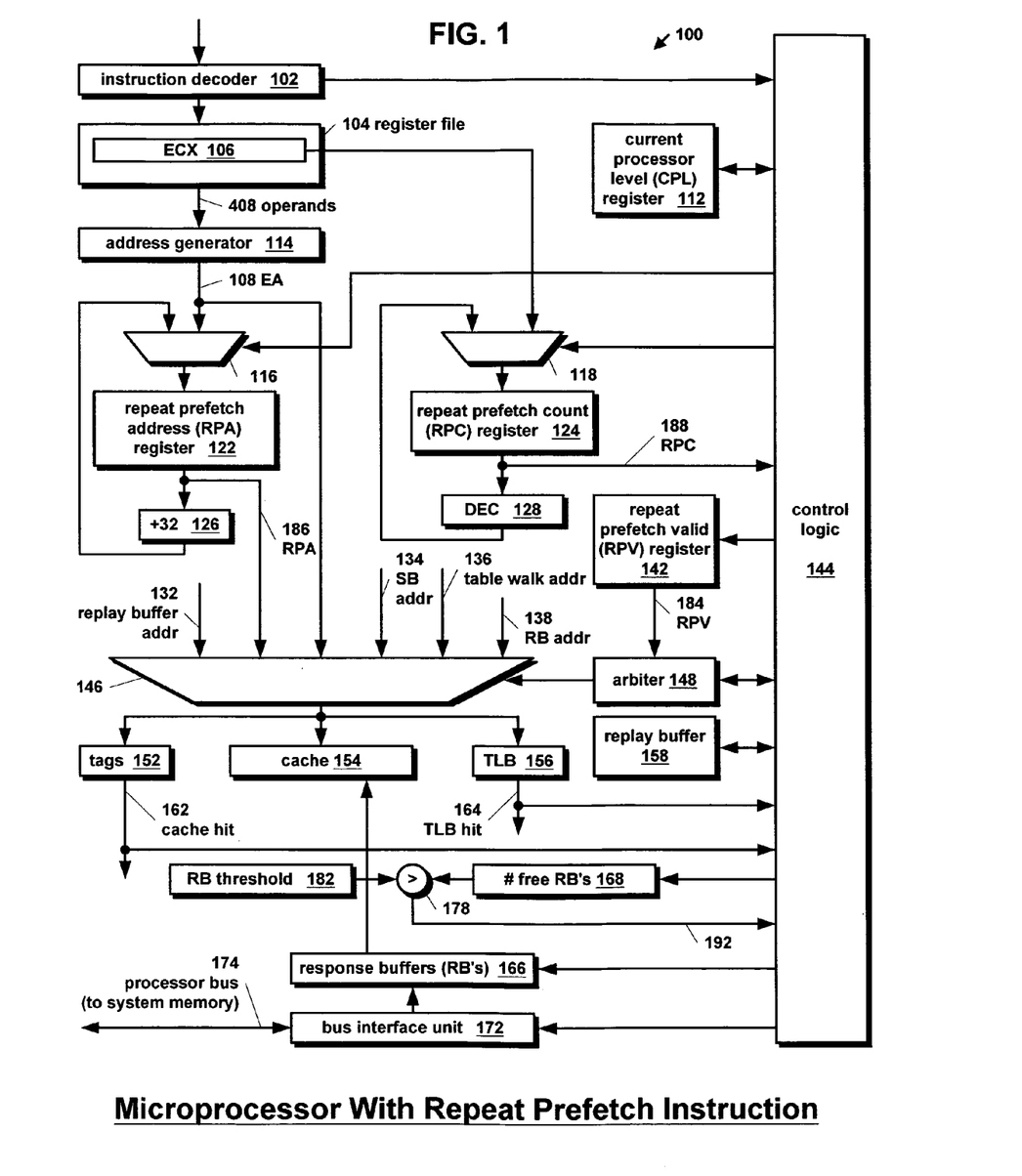
FIG. 1 is a block diagram of a microprocessor according to the present invention.

Referring now to FIG. 1, a block diagram of a microprocessor 100 according to the present invention is shown. The microprocessor 100 comprises an instruction decoder 102. The instruction decoder 102 receives instruction bytes from an instruction cache (not shown). In one embodiment, the instruction bytes comprise x86 architecture instruction bytes. The instruction decoder 102 decodes the instruction bytes. In particular, the instruction decoder 102 is configured to decode a repeat prefetch instruction according to the present invention, which is described with respect to FIG. 4. Before describing the repeat prefetch instruction of FIG. 4, the Pentium III PREFETCH and REP string instructions will first be described with respect to FIGS. 2 and 3.

Figure 2:
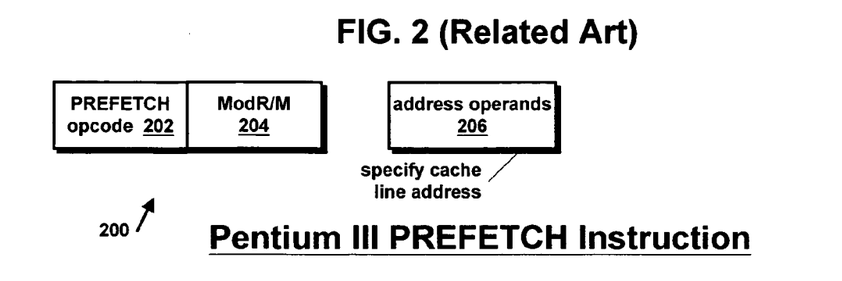
FIG. 2 is a block diagram of a related art Pentium III PREFETCH instruction.

Referring now to FIG. 2, a block diagram of a related art Pentium III PREFETCH instruction 200 is shown. The Pentium III processor instruction set includes a PREFETCH instruction that fetches a cache line of data from system memory into a location in the processor cache hierarchy. The Pentium III PREFETCH instruction is described in detail at pages 3-600 to 3-601 in the IA-32 Intel Architecture Software Developer's Manual, Volume 2: Instruction Set Reference, 2001, which are hereby incorporated by reference.

The PREFETCH instruction 200 comprises a PREFETCH opcode 202. The PREFETCH opcode 202 has a predetermined value of 0x0F18 to differentiate the PREFETCH instruction 200 from other instructions in the Pentium III instruction set. The PREFETCH instruction 200 also comprises a ModR/M byte 204. The PREFETCH instruction 200 also comprises address operands 206 that specify the address of a byte in system memory. The PREFETCH instruction 200 prefetches the cache line from system memory containing the specified byte into the processor cache hierarchy.

The ModR/M byte 204 performs two functions in the PREFETCH instruction 200. The first function of the ModR/M byte 204 of the PREFETCH instruction 200 is to specify an addressing mode. The addressing mode determines how the address operands 206 will be used to generate an effective address of the byte containing the cache line to be prefetched. The effective address may be specified in a variety of ways. For example, the effective address operands 206 may be specified in a segment:offset format in registers of the processor register file, such as the DS:ESI registers. Depending upon the addressing mode, additional bytes, such as a SIB byte, displacement, and/or immediate bytes may comprise the address operands 206 used to generate the effective address. The general format of a Pentium III instruction and an explanation of the addressing modes are described at pages 2-1 through 2-7 of the IA-32 Intel Architecture Software Developer's Manual, Volume 2: Instruction Set Reference, 2001, which are hereby incorporated by reference.

The second function of the ModR/M byte 204 of the PREFETCH instruction 200 is to specify a locality hint. The locality hint specifies which location in the cache hierarchy of the Pentium III processor to fetch the specified cache line into. The cache hierarchy location specified by each of the predetermined values of the locality hint 204 is processor-specific.

A disadvantage of the Pentium III PREFETCH instruction 200 is that it does not allow a programmer to specify multiple cache lines to be prefetched, but instead only guarantees prefetch of a single cache line.

Figure 3:
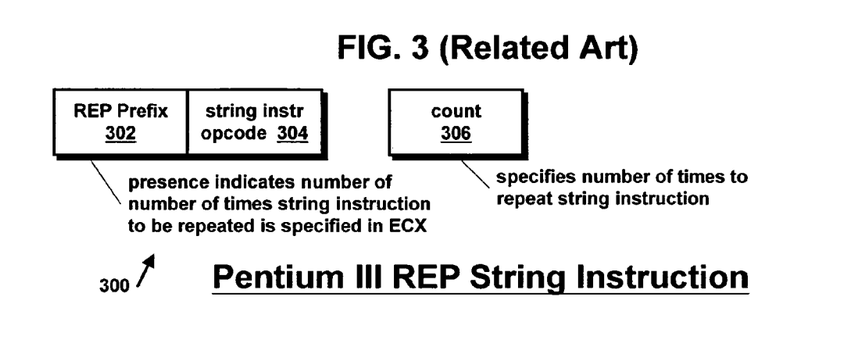
FIG. 3 is a block diagram of a related art Pentium III string instruction with a REP string operation prefix.

Referring now to FIG. 3, a block diagram of a related art Pentium III string instruction with a REP string operation prefix 300 is shown. The x86 architecture instruction set, including the Pentium III processor, includes string operation instructions that perform operations on bytes, words, or double-words of data. Examples of the operations are inputting from a port, outputting to a port, moving from one location in memory to another, loading from memory to a processor register, storing from a processor register to memory, comparing, or finding. The string operation is specified in a string instruction opcode 304 comprised in the REP string instruction 300. The presence of a REP prefix 302 comprised in the REP string instruction 300 instructs the processor to repeat the string operation specified in the string instruction opcode 304 a number of times specified in a count 306 comprised in the REP string instruction 300. The REP prefix 302 has one of two predetermined values, either 0xF2 or 0xF3, depending upon the particular string instruction to be repeated. A programmer loads the count 306 into the ECX register of the Pentium III register file prior to executing the REP string instruction 300. The REP string operation prefix instructions 300 are described in detail at pages 3-677 through 3-679 of the IA-32 Intel Architecture Software Developer's Manual, Volume 2: Instruction Set Reference, 2001, which are hereby incorporated by reference.

Figure 4:
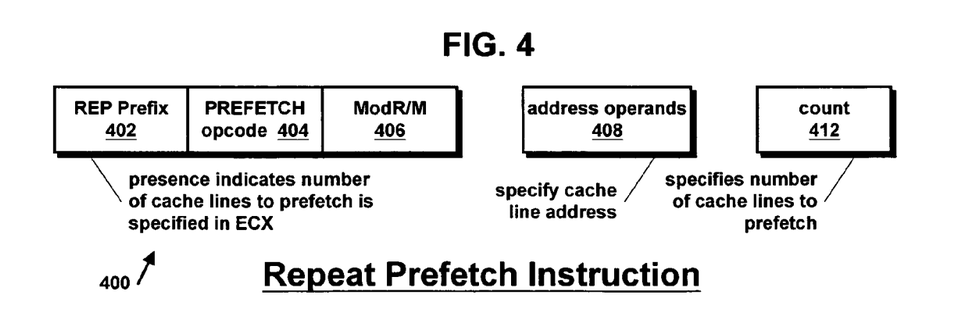
FIG. 4 is a block diagram of a repeat prefetch instruction according to the present invention.

Referring now to FIG. 4, a block diagram of a repeat prefetch instruction (REP PREFETCH) 400 according to the present invention is shown. The repeat prefetch instruction 400 comprises a REP prefix 402, followed by a PREFETCH opcode 404, a ModR/M byte 406, address operands 408, and a count 412. The REP prefix 402 is similar to REP prefix 302 of FIG. 3. The presence of the REP prefix 402 in the repeat prefetch instruction 400 indicates that multiple cache lines are to be prefetched. In one embodiment, the number of cache lines to be prefetched, i.e., count 412, is specified in the ECX register 106 of FIG. 1. The PREFETCH opcode 404 is similar to the PREFETCH opcode 202 of FIG. 2 and the ModR/M byte 406 is similar to the ModR/M byte 204 of FIG. 2. Likewise, the address operands 408 are similar to the address operands 206 of FIG. 2. Advantageously, the repeat prefetch instruction 400 enables a programmer to specify the prefetch of multiple cache lines. Other advantages of the repeat prefetch instruction 400 will be described below.

Referring again to FIG. 1, the microprocessor 100 also comprises control logic 144 coupled to the instruction decoder 102. After decoding the repeat prefetch instruction 400 of FIG. 4, the instruction decoder 102 provides instruction decode information to the control logic 144. In particular, the instruction decoder 102 informs control logic 144 that a repeat prefetch instruction 400 has been decoded.

The microprocessor 100 also comprises a register file 104 coupled to the instruction decoder 102. In one embodiment, the register file 104 comprises substantially similar registers to the Pentium III register file. In particular, the register file 104 comprises an ECX register 106 similar to the ECX register of the Pentium III register file. The ECX register 106 is loaded with the count of cache lines to be prefetched by the repeat prefetch instruction 400 prior to execution of the repeat prefetch instruction 400. The register file 104 also includes other registers used to store address operands 408 of FIG. 4 of the repeat prefetch instruction 400 for calculating the effective address of the repeat prefetch instruction 400. The instruction decoder 102 and/or register file 104 provide the address operands 408 to the address generator 114 after decoding the repeat prefetch instruction 400.

The microprocessor 100 also comprises an address generator 114 coupled to the register file 104. The address generator 114 receives address operands 408 from the register file 104 and/or the instruction decoder 102 and generates an effective address 108 based on the address operands 408.

The microprocessor 100 also comprises a multiplexer 116 coupled to the address generator 114. The first input to multiplexer 116 receives the effective address 108 from the address generator 114. The second input to multiplexer 116 receives the output of an incrementer 126. The multiplexer 116 selects one of the two inputs based on a control signal from the control logic 144.

The microprocessor 100 also comprises a repeat prefetch address (RPA) register 122 coupled to the output of multiplexer 116. The RPA register 122 stores and outputs a repeat prefetch address (RPA) 186, which is the current address of the cache line to be prefetched. Initially, the RPA register 122 stores the effective address 108 generated by address generator 114. The RPA 186 is output by the RPA register 122 to incrementer 126. Incrementer 126 increments the RPA 186 by the size of a cache line and provides the incremented address back to the second input of multiplexer 116 so that each time a cache line is prefetched, the RPA 186 in RPA register 122 may be updated. In one embodiment, the size of a cache line is 32 bytes.

The microprocessor 100 also comprises a second multiplexer 146 coupled to the RPA register 122. The multiplexer 146 receives the RPA 186 from the RPA register 122. The multiplexer 146 also receives the effective address 108 from address generator 114. The multiplexer 146 also receives a replay buffer address 132, store buffer (SB) address 134, table walk address 136, and response buffer (RB) address 138.

The microprocessor 100 also comprises a cache 154 coupled to multiplexer 146. The cache 154 is addressed by the output of multiplexer 146. The cache 154 is representative of the cache hierarchy of the microprocessor 100. In one embodiment, the cache 154 comprises a level-1 data cache and a level-2 data cache. Cache lines prefetched from system memory by the repeat prefetch instruction 400 are fetched into the cache 154.

The microprocessor 100 also comprises a tag array 152, or directory 152, coupled to the multiplexer 146. The tag array 152 is also addressed by the output of multiplexer 146. The tag array 152 stores tags and status associated with cache lines stored in cache 154. The tag array 152 generates a cache hit signal 162. If the output of the multiplexer 146 matches a valid tag stored in the tag array 152, then tag array 152 generates a true value on cache hit signal 162. Otherwise, tag array 152 generates a false value on cache hit signal 162. The cache hit signal 162 is provided to the control logic 144.

The microprocessor 100 also comprises a translation lookaside buffer (TLB) 156 coupled to multiplexer 146. TLB 156 is also addressed by the output of multiplexer 146. TLB 156 caches page table directory information to reduce the time required to perform page translation. The TLB 156 generates a TLB hit signal 164. If valid page directory information associated with the address output by multiplexer 146 is present in the TLB 156, then TLB 156 generates a true value on TLB hit signal 164. Otherwise, TLB 156 generates a false value on TLB hit signal 164, and a table walk must be performed to obtain the desired page directory information. The TLB hit signal 164 is provided to the control logic 144.

The microprocessor 100 also comprises a third multiplexer 118, coupled to the ECX register 106. The multiplexer 118 receives on a first input the count 412 of the repeat prefetch instruction 400 of FIG. 4 from the ECX register 106. The multiplexer 118 receives on a second input the output of a decrementer 128. The multiplexer 118 selects one of the two inputs based on a control signal from the control logic 144.

The microprocessor 100 also comprises a repeat prefetch count (RPC) register 124 coupled to the output of multiplexer 118. The RPC register 124 stores and outputs a repeat prefetch count (RPC) 188, which is the current number of cache lines remaining to be prefetched by the repeat prefetch instruction 400. Initially, the RPC register 124 stores the count 412 of the repeat prefetch instruction 400 stored in ECX register 106. The RPC 188 is output by the RPC register 124 to decrementer 128. Decrementer 128 decrements the RPC 188 by one and provides the decremented count back to the second input of multiplexer 118 so that each time a cache line is prefetched, the RPC 188 in RPC register 124 may be updated. The RPC 188 is also provided by RPC register 124 to control logic 144.

The microprocessor 100 also comprises a repeat prefetch valid (RPV) register 142 coupled to control logic 144. The RPV register 142 stores and outputs a repeat prefetch valid (RPV) bit 184. The RPV bit 184 is true if a repeat prefetch instruction 400 is to be executed, as described below with respect to FIGS. 5 and 6.

The microprocessor 100 also comprises an arbiter 148 coupled to multiplexer 146. The arbiter 148 receives the RPV bit 184 from RPV register 142. The arbiter 148 is also in communication with control logic 144. Arbiter 148 arbitrates between various resources in the microprocessor 100 desiring access to the cache 154, tag array 152 and/or TLB 156. In one embodiment, the resources include the repeat prefetch instruction 400, table walk logic, store buffers, response buffers 166, and a replay buffer 158. Based on the RPV bit 184 and communications from the control logic 144 as described below, arbiter 148 controls multiplexer 146 to select one of the inputs to multiplexer 146 listed above so that one of the resources may have access to the cache 154, tag array 152 and/or TLB 156. In one embodiment, the repeat prefetch instruction 400 is lowest priority among the resources competing for access to the cache 154, tag array 152 and/or TLB 156.

The microprocessor 100 also comprises a replay buffer 158 coupled to control logic 144. The replay buffer 158 is used to store some of the state of a repeat prefetch instruction 400 when the repeat prefetch instruction 400 loses arbitration with the arbiter 148 for the cache 154, tag array 152 and/or TLB 156. The replay buffer 158 advantageously enables the repeat prefetch instruction 400 to have persistence, which is particularly important since a repeat prefetch instruction 400 will rarely win arbitration for a sufficient length of time to complete prefetching of all the cache lines specified in count 412 before being preempted by a higher priority resource.

The microprocessor 100 also comprises a current processor level (CPL) register 112 coupled to control logic 144. The CPL register 112 stores the CPL of the microprocessor 100. The CPL specifies a current privilege level of the microprocessor 100. The CPL is typically used by the operating system as a means of system protection. For example, programs with insufficient privilege level may be prevented from executing certain instructions, such as input/output instructions. In one embodiment, the CPL comprises a value of 0 through 3, corresponding substantially to ring levels 0 through 3 of a Pentium III.

The microprocessor 100 also comprises a bus interface unit 172 coupled to control logic 144. The bus interface unit 172 couples the microprocessor 100 to a processor bus 174, across which the microprocessor 100 fetches data from system memory. In the present disclosure, system memory refers to a memory other than the cache memory 154 of the microprocessor 100, such as system DRAM or video frame buffer. In particular, bus interface unit 172 prefetches cache lines from system memory specified by a repeat prefetch instruction 400.

The microprocessor 100 also comprises response buffers (RB) 166 coupled to bus interface unit 172. Response buffers 166 receive data fetched from system memory by bus interface unit 172. In particular, response buffers 166 receive prefetched cache lines from system memory specified by repeat prefetch instructions 400. The prefetched cache lines stored in the response buffers 166 are provided to the cache 154 for storage therein. In one embodiment, the response buffers 166 are shared among other instructions that fetch data from the processor bus 174 in addition to repeat prefetch instructions 400. Hence, repeat prefetch instructions 400 compete with other, potentially higher priority, instructions for use of the response buffers 166 resource. In one embodiment, the number of response buffers 166 is eight.

The microprocessor 100 also comprises a free response buffer (RB) register 168 coupled to control logic 144. The control logic 144 updates the free RB register 168 with the number of free response buffers 166 each time a response buffer 166 is allocated or freed.

The microprocessor 100 also comprises a response buffer (RB) threshold register 182. The RB threshold register 182 is a register that stores a threshold value described below. In one embodiment, the threshold value is predetermined. In another embodiment, the threshold value is programmable by a system programmer. In another embodiment, the threshold value is programmable by an external input to the microprocessor 100.

The microprocessor 100 also comprises a comparator 178 coupled to the free RB register 168 and to the RB threshold register 182. The comparator 178 compares the threshold value 182 to the number of free response buffers 166 and generates a result signal 192 in response thereto. In one embodiment, if the number of free response buffers 166 is greater than the threshold value, then comparator 178 generates a true value on signal 192. Otherwise, comparator 178 generates a false value on signal 192. The result signal 192 is provided to control logic 144.

Figure 5:
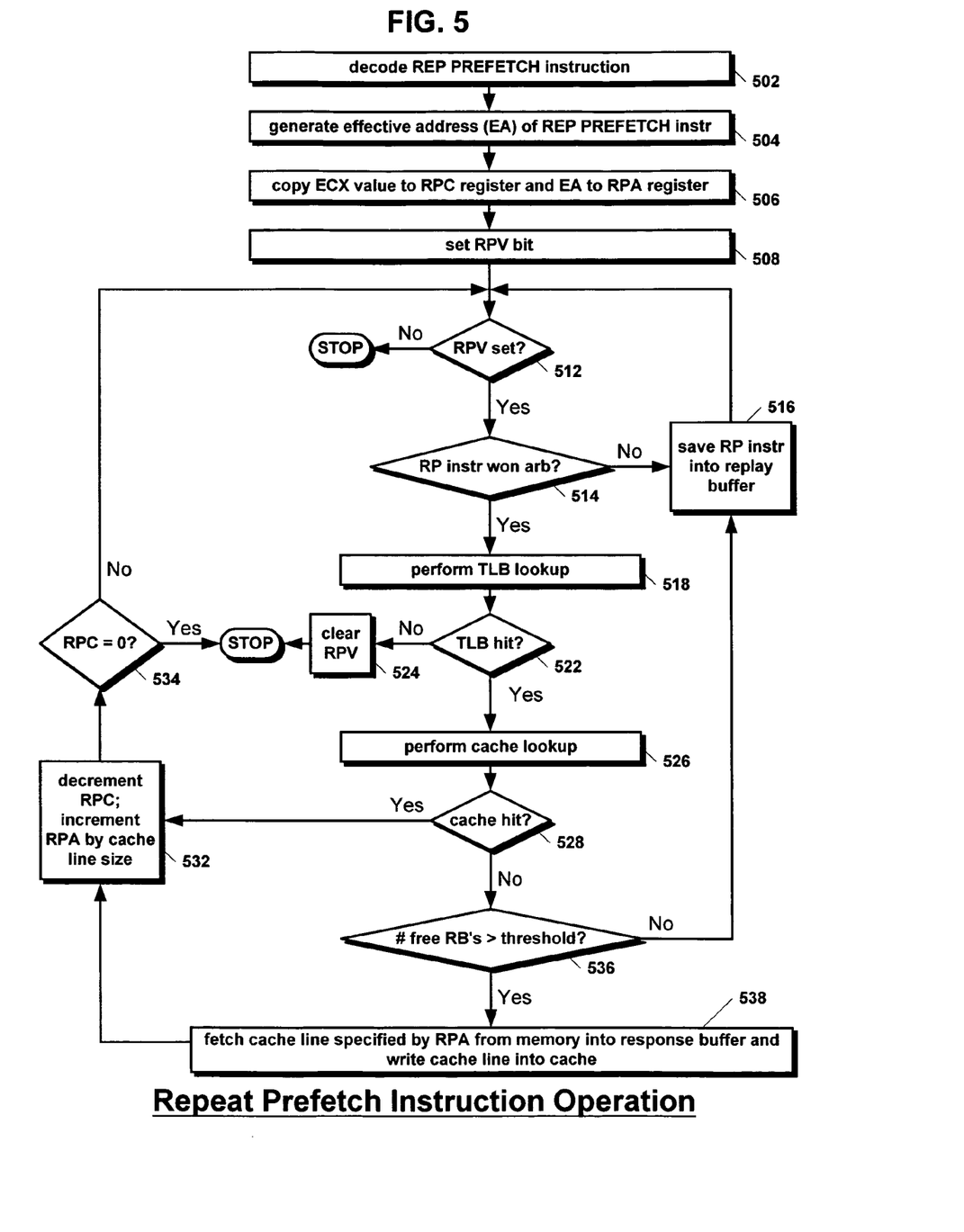
FIG. 5 is a flowchart illustrating operation of the microprocessor of FIG. 1 to perform a repeat prefetch instruction of FIG. 4 according to the present invention.

Referring now to FIG. 5, a flowchart illustrating operation of the microprocessor 100 of FIG. 1 to perform a repeat prefetch instruction 400 of FIG. 4 according to the present invention is shown. Prior to execution of the repeat prefetch instruction 400, another instruction loads the count value in ECX register 106 of FIG. 1. Flow begins at block 502.

At block 502, the instruction decoder 102 of FIG. 1 detects a REP prefix byte 402 of FIG. 4 followed by a PREFETCH opcode 404 of FIG. 4. That is, instruction decoder 102 decodes a repeat prefetch instruction 400 of FIG. 4. Flow proceeds from block 502 to block 504.

At block 504, address generator 114 of FIG. 1 generates effective address 108 of FIG. 1 for the repeat prefetch instruction 400 based on the ModR/M byte 406 and address operands 408 of FIG. 4. Flow proceeds from block 504 to block 506.

At block 506, control logic 144 copies the count value in ECX register 106 to RPC register 124 and effective address 108 to RPA register 122 of FIG. 1. The count value in ECX register 106 was loaded by an instruction previous to the repeat prefetch instruction 400. Flow proceeds from block 506 to block 508.

At block 508, control logic 144 sets RPV bit 184 to a true value in RPV register 142 of FIG. 1 to indicate to arbiter 148 of FIG. 1 that a valid repeat prefetch instruction 400 is ready to obtain access to the cache 154 of FIG. 1 for performing prefetching of cache lines. Flow proceeds from block 508 to decision block 512.

At decision block 512, arbiter 148 determines whether RPV bit 184 is set to a true value. If so, flow proceeds to decision block 514. Otherwise, flow ends.

At decision block 514, arbiter 148 determines whether the repeat prefetch instruction 400 won arbitration for access to the cache 154, tag array 152 and/or TLB 156 of FIG. 1. If not, flow proceeds to block 516. Otherwise, flow proceeds to block 518.

At block 516, control logic 144 saves the state of the repeat prefetch instruction 400 into replay buffer 158 of FIG. 1 so that the repeat prefetch instruction 400 can be resumed once it wins arbitration in the future. Flow proceeds from block 516 back to decision block 512 to attempt to proceed with the repeat prefetch instruction 400. After flow proceeds back to decision block 512, if a repeat prefetch instruction 400 wins arbitration at block 514, the repeat prefetch instruction 400 state is restored from the replay buffer 158 so that the repeat prefetch instruction 400 may proceed.

At block 518, RPA 186 is provided to TLB 156 to perform a lookup of the RPA 186 in TLB 156 to generate TLB hit signal 164 of FIG. 1. Flow proceeds from block 518 to decision block 522.

At decision block 522, control logic 144 determines whether the TLB hit signal 164 has a true value. If not, flow proceeds to block 524. Otherwise, flow proceeds to block 526.

At block 524, control logic 144 clears the RPV bit 184 in the RPV register 142 to indicate that the repeat prefetch instruction 400 is no longer valid, i.e., that the repeat prefetch instruction 400 no longer desires access to the cache 154, tag array 152 and/or TLB 156 of FIG. 1. Advantageously, the repeat prefetch instruction 400 stops prefetching cache lines on a miss of the TLB 156, since a page table walk would be required. This potentially increases the efficiency of the microprocessor 100 and/or system by not generating additional traffic on the processor bus 174 to perform the page table walk necessary to complete the repeat prefetch instruction 400. Flow ends at block 524.

At block 526, RPA 186 is provided to tag array 152 to perform a lookup of the RPA 186 in tag array 152 to generate cache hit signal 162 of FIG. 1. Flow proceeds from block 526 to decision block 528.

At decision block 528, control logic 144 determines whether the cache hit signal 162 has a true value. If so, flow proceeds to block 532. Otherwise, flow proceeds to decision block 536.

At block 532, a cache hit has occurred. Consequently, the cache line specified by the RPA 186 does not need to be prefetched because it already resides in the cache 154. Therefore, control logic 144 increments the RPA 186 and decrements the RPC 188, thereby advantageously potentially increasing the efficiency of the microprocessor 100 and/or system by not performing an unnecessary cache line prefetch, which, among other things, creates unnecessary traffic on the processor bus 174. Flow proceeds from block 532 to decision block 534.

At decision block 534, control logic 144 determines whether the RPC 188 has a value of 0 to determine whether all the cache lines specified by the repeat prefetch instruction 400 have been prefetched. If not, flow proceeds back to decision block 512 to prefetch another cache line. Otherwise, flow ends.

At decision block 536, control logic 144 determines whether result signal 192 of FIG. 1 generated by comparator 178 of FIG. 1 indicates the number of free response buffers 166 of FIG. 1 is greater than the value stored in threshold register 182 of FIG. 1. If not, flow proceeds to block 516. Otherwise, flow proceeds to block 538. In order to prefetch a cache line, control logic 144 must allocate one of the response buffers 166 to the prefetch, which may result in subsequently starving a higher priority instruction from allocating a response buffer 166 it needs. Advantageously, by not prefetching cache lines if not enough free response buffers 166 exist, the efficiency of the microprocessor 100 is potentially increased.

At block 538, all the conditions have been satisfied for the repeat prefetch instruction 400 to prefetch the next cache line. Consequently, control logic 144 allocates a response buffer 166 and instructs the bus interface unit 172 of FIG. 1 to fetch the cache line specified by the RPA 186 from system memory into the allocated response buffer 166. When the bus interface unit 172 fetches the cache line into the response buffer 166, the cache line is then written into the cache 154 according to the locality hint specified in the ModR/M byte 406 of FIG. 4. Flow proceeds from block 538 to block 532 to increment the RPA 186 and decrement the RPC 188 and prefetch the next cache line if necessary and if all the conditions are met.

Figure 6:
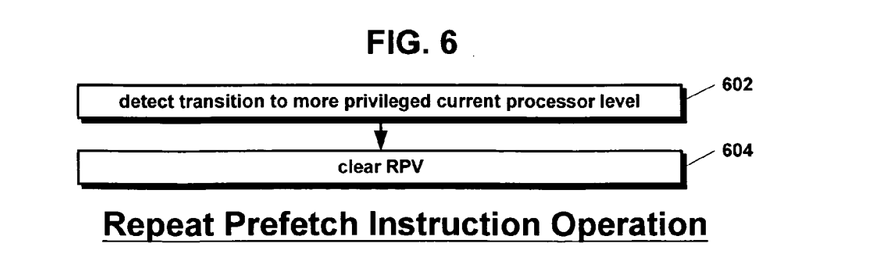
FIG. 6 is a flowchart illustrating further operation of the microprocessor of FIG. 1 to perform a repeat prefetch instruction of FIG. 4 according to the present invention.

Referring now to FIG. 6, a flowchart illustrating further operation of the microprocessor 100 of FIG. 1 to perform a repeat prefetch instruction 400 of FIG. 4 according to the present invention is shown. Flow begins at block 602.

At block 602, control logic 144 of FIG. 1 detects that a change in the CPL stored in the CPL register 112 of FIG. 1 has occurred. The change of the CPL may occur asynchronously, such as due to an interrupt or exception of the microprocessor 100. Flow proceeds from block 602 to block 604.

At block 604, control logic 144 clears the RPV bit 184 of FIG. 1, which effectively stops the repeat prefetch instruction 400 since the next time flow proceeds to decision block 512 of FIG. 5 the repeat prefetch instruction 400 will be terminated. In one embodiment, control logic 144 clears the RPV bit 184 only if the transition in the CPL detected at block 602 is from a lower to higher priority. Advantageously, the present invention potentially increases the efficiency of the microprocessor 100 by stopping the repeat prefetch instruction 400 if a higher priority task or program takes control of the microprocessor 100. Flow ends at block 604.

As may be seen from the foregoing description, the present invention advantageously provides a repeat prefetch instruction in which the processor itself controls the prefetching of a large block of data in an efficient manner, rather than relying on a programmer to hand-place single cache line prefetch instructions, which practice is subject to inefficiency caused by the range of core/bus clock ratios that may exist, for example.

Although the present invention and its objects, features, and advantages have been described in detail, other embodiments are encompassed by the invention. For example, the present invention is adaptable to microprocessors having a variety of instruction sets and cache hierarchy structures.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A microprocessor for executing a prefetch instruction specifying a block of cache lines to be prefetched from a system memory into a cache of the microprocessor, the microprocessor comprising:
   a prefetch count register, for storing a count of the cache lines remaining to be prefetched;
   a general purpose register, coupled to said prefetch count register, for storing an initial value of said count, said initial value loaded into said general purpose register by an instruction prior to the prefetch instruction; and
   control logic, coupled to said prefetch count register, for copying said initial value from said general purpose register to said prefetch count register in response to decoding the prefetch instruction, wherein the prefetch instruction comprises an opcode preceded by a prefix, wherein said opcode is two bytes having predetermined hexadecimal values 0F 18, wherein said prefix is a byte having a predetermined hexadecimal value of F2 or F3.

2. A microprocessor for executing a prefetch instruction specifying a block of cache lines to be prefetched from a system memory into a cache of the microprocessor, the microprocessor comprising:
   a prefetch count register, for storing a count of the cache lines remaining to be prefetched;
   a general purpose register, coupled to said prefetch count register, for storing an initial value of said count, said initial value loaded into said general purpose register by an instruction prior to the prefetch instruction; and
   control logic, coupled to said prefetch count register, for copying said initial value from said general purpose register to said prefetch count register in response to decoding the prefetch instruction, wherein said control logic ceases prefetching the cache lines if a current privilege level of a program currently executing on the microprocessor changes.

3. A microprocessor, comprising:
   an instruction decoder, for decoding instructions in an instruction set, said instruction set comprising at least a set of instructions defined by an Intel Pentium III processor, said instruction set further comprising a repeat prefetch instruction; and
   said repeat prefetch instruction comprising:
      an opcode of two bytes having predetermined hexadecimal values 0F 18;
      a prefix byte preceding said opcode, said prefix byte having a predetermined hexadecimal value of F2 or F3; and
      a count specifying a number of cache lines to be prefetched.

4. The microprocessor of claim 3, further comprising:
   a register file, coupled to said instruction decoder, said register file comprising an ECX register, wherein said count is stored in said ECX register.

5. The microprocessor of claim 4, wherein said count is loaded into said ECX register by an instruction prior to said repeat prefetch instruction.

6. The microprocessor of claim 3, further comprising:
   a repeat prefetch count register, coupled to said instruction decoder, wherein said count is initially copied from said ECX register to said repeat prefetch count register.

7. The microprocessor of claim 6, wherein said repeat prefetch count register updateably stores said count during execution of said repeat prefetch instruction.

8. The microprocessor of claim 3, wherein said repeat prefetch instruction further comprises:
   one or more address operands, for specifying an effective address of said cache lines.

9. The microprocessor of claim 8, further comprising:
   a repeat prefetch address register, coupled to said instruction decoder, for updateably storing said effective address of said cache lines during execution of said repeat prefetch instruction.

10. A microprocessor in a system with a system memory, the microprocessor comprising:
   an instruction decoder, for decoding a prefetch instruction specifying a count of cache lines to prefetch from the system memory and an address in the system memory of said cache lines;
   an address register, coupled to said instruction decoder, for storing said address specified in said prefetch instruction;

a count register, coupled to said instruction decoder, for storing said count specified in said prefetch instruction; and control logic, coupled to said address register, configured to control the microprocessor to prefetch said cache lines specified in said address register and said count register from the system memory into a cache memory of the microprocessor, wherein said prefetch instruction comprises an opcode, wherein said opcode is two bytes having predetermined hexadecimal values 0F 18.

11. The microprocessor of claim 10, wherein said prefetch instruction comprises said opcode preceded by a prefix byte having a predetermined hexadecimal value of F2 or F3.

12. The microprocessor of claim 11, wherein said count is specified in a general purpose register of a register file of the microprocessor.

13. The microprocessor of claim 12, wherein said control logic copies said count specified in said general purpose register to said count register prior to prefetching said cache lines.

14. The microprocessor of claim 12, wherein said general purpose register conforms to an ECX register of a Pentium III architecture register file.

15. A microprocessor in a system with a system memory, the microprocessor comprising:

an instruction decoder, for decoding a prefetch instruction specifying a count of cache lines to prefetch from the system memory and an address in the system memory of said cache lines;

an address register, coupled to said instruction decoder, for storing said address specified in said prefetch instruction;

a count register, coupled to said instruction decoder, for storing said count specified in said prefetch instruction; and control logic, coupled to said address register, configured to control the microprocessor to prefetch said cache lines specified in said address register and said count register from the system memory into a cache memory of the microprocessor, wherein said control logic stops prefetching said cache lines if the microprocessor changes its current privilege level of a program currently executing on the microprocessor.

16. A method of a microprocessor prefetching cache lines into its cache, the method comprising:

(a) detecting a repeat prefetch instruction specifying a count of cache lines for prefetching from a system memory address;

(b) copying said count from a general purpose register of the microprocessor to a prefetch count register;

(c) storing said address in a prefetch address register;

(d) prefetching a cache line specified by said prefetch address register into the cache;

(e) decrementing said prefetch count register;

(f) incrementing said prefetch address register;

(g) repeating said steps (d), (e), and (f) until said prefetch count register reaches a zero value; and terminating said steps (d) through (g) if a current privilege level changes of a program currently executing on the microprocessor.

17. The microprocessor of claim 2, wherein said current privilege level comprises a Pentium III current privilege level (CPL).

18. The microprocessor of claim 15, wherein said current privilege level comprises a Pentium III current privilege level (CPL).

19. The microprocessor of claim 16, wherein said current privilege level comprises a Pentium III current privilege level (CPL).

* * * * *